United States Patent [19]
Omura et al.

[11] 4,226,879
[45] Oct. 7, 1980

[54] ANTIBIOTIC COMPOSITION

[75] Inventors: Satoshi Omura, Tokyo; Chiaki Kitao, Yokohama; Akira Nakagawa, Fuchu; Haruo Tanaka, Machida; Juichi Awaya, Soka; Ruiko Oiwa, Yokohama, all of Japan

[73] Assignees: Kyowa Hakko Kogyo Kabushiki Kaisha, Ohte; The Kitasato Institute, Tokyo, both of Japan

[21] Appl. No.: 939,102

[22] Filed: Sep. 1, 1978

Related U.S. Application Data

[63] Continuation-in-part of Ser. No. 821,361, Aug. 3, 1977, abandoned, which is a continuation-in-part of Ser. No. 771,875, Feb. 25, 1977, abandoned.

[30] Foreign Application Priority Data

Feb. 27, 1976 [JP] Japan .................................. 51-20119
Aug. 3, 1976 [JP] Japan .................................. 51-92426
Aug. 3, 1976 [JP] Japan .................................. 51-92427

[51] Int. Cl.$^2$ .................. A61K 31/335; C07D 303/06; A61K 35/00
[52] U.S. Cl. .................................... 424/278; 424/122; 542/420; 435/169
[58] Field of Search ............. 424/122, 278; 195/80 R; 542/420; 435/169

[56] References Cited
U.S. PATENT DOCUMENTS 3,927,211  12/1975  Vos et al. .............................. 424/122
3,959,468  5/1976  Burmeister ........................... 424/122

*Primary Examiner*—Jerome D. Goldberg
*Attorney, Agent, or Firm*—Wolder, Gross & Yavner

[57] ABSTRACT

The present invention relates to a new composition designated as AM-1042 or asukamycin. AM-1042 has an antibiotic activity upon Gram-positive bacteria and Eimeria, and its acute toxicity ($LD_{50}$' ip.) in mice was 48.5 mg./kg. AM-1042 has an excellent therapeutical effect on various infectious diseases caused by a parasite of Gram-positive bacteria and Eimeria. AM-1042 has been confirmed to be distinguishable from known antibiotics such as e.g. amicetin B, azomycin and manumycin. AM-1042 is produced by fermentation of a microorganism belonging to the genus Streptomyces and capable of producing AM-1042. A composition capable of preventing and curing coccidiosis of poultry containing AM-1042 as active ingredient.

10 Claims, 3 Drawing Figures

ANTIBIOTIC COMPOSITION

RELATED APPLICATION

The present application is a continuation-in-part of Ser. No. 821,361, now abandoned filed Aug. 3, 1977, which in turn is a continuation-in-part of Ser. No. 771,875, now abandoned filed Feb. 25, 1977, both of which are filed in the names of the present inventors.

DRAWINGS

Figure 1:
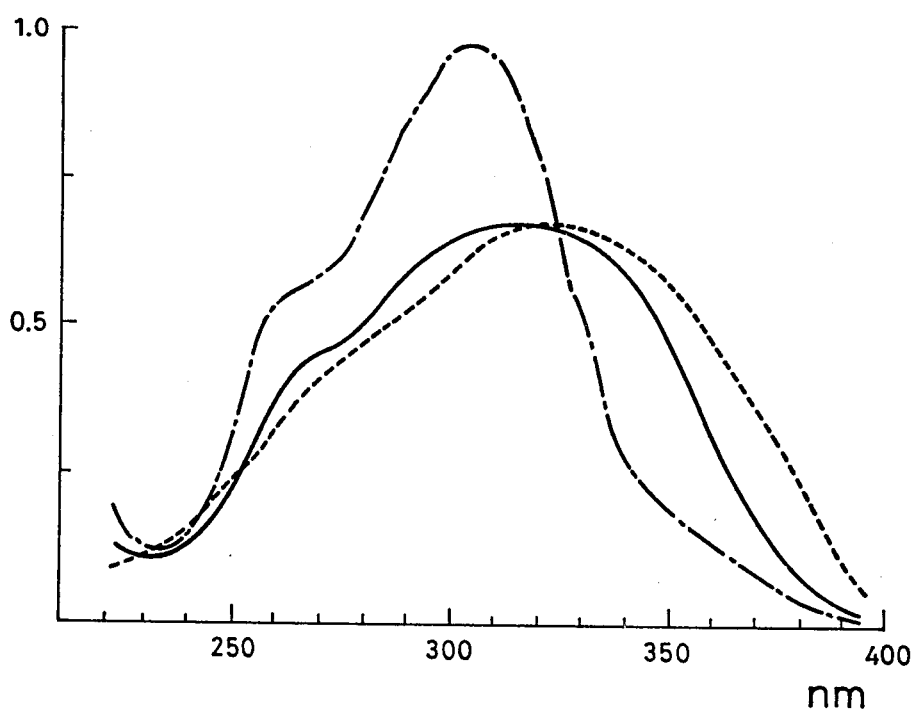
Figure 2:
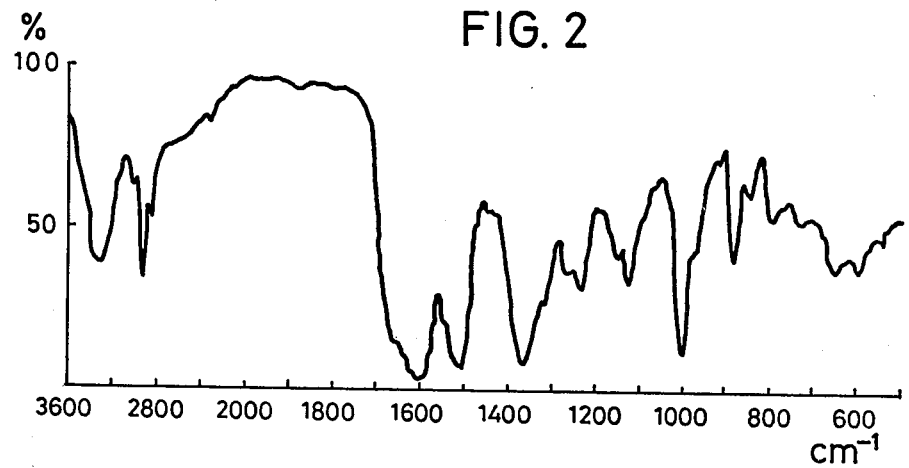
Figure 3:
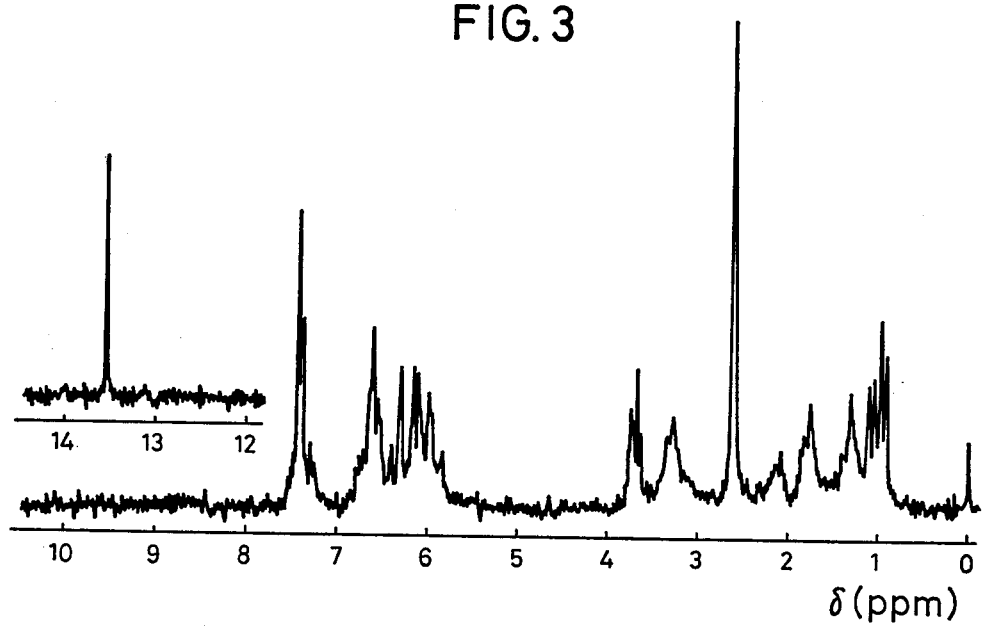

FIGS. 1, 2 and 3 show the UV, IR and NMR spectra of AM-1042 respectively.

SUMMARY OF THE INVENTION

AM-1042 viz. asukamycin of the present invention has an antibiotic activity and it is neutral in its purified crystalline form. AM-1042 has the following physical and chemical characteristics:

(1) Composed essentially of carbon, hydrogen, nitrogen and oxygen.

(2) Melting point: 185°–190° C. (decomp)

(3) UV absorption spectrum (FIG. 1)

Absorptions at 315 and 265 nm (shoulder) in 90% methanol solution, at 305 and 260 nm (shoulder) in 0.1N NaOH-90% methanol solution, and at 320 and 280 nm (shoulder) in 0.1 N HCl-90% methanol solution.

(4) Specific rotation: $[\alpha]_D^{20} = +175°$ to 184°; and 181° in average (c=0.5 in CHCl$_3$).

(5) Infrared absorption spectrum (FIG. 2): By KBr method, there are absorptions observed at 3330–3340 cm$^{-1}$ due to the presence of amine of hydroxy group, at 2925 and 2850 cm$^{-1}$ due to the presence of methyl and methylene groups, at 1660 and 1600 cm$^{-1}$ due to the presence of carbonyl and double bond groups.

(6) Nuclear magnetic resonance spectrum: as shown in FIG. 3.

(7) Color reaction: Positive in Ehrlich reaction, Dragendorff reaction, and iodine reaction. Negative in Molisch reaction, Fehling reaction, ninhydrin reaction, Beilstein reaction and Rydon-Smith reaction.

(8) Solubility in various solvents: Easily soluble in dimethylsulfoxide and dimethylformamide. Soluble in acetone, chloroform, ethyl acetate, ethanol and methanol. Insoluble in petroleum ether, n-hexane and water.

(9) Rf values by chromotography: Thin layer chromatography using silica gel (Kieselgel G, 0.3 mm, commercially available from Merck Inc., U.S.A.) carried out in conventional manner gave the following Rf values:

Benzene-acetone (13:7): 0.40
Chloroform-methanol (10:1): 0.56
Ethyl acetate-methanol (87:13): 0.66

(10) Elemental analysis and molecular formula:

|  |  | C % | H% | N% | O% |
|---|---|---|---|---|---|
| Elemental analysis: | Calcd. | 68.12 | 6.27 | 5.12 | 20.49 |
|  | Found | 68.13 | 6.26 | 4.92 | 20.69 |

The molecular weight as determined by FD-Mass Spectrometry M+ (m/e) was 546. From the elemental analysis and molecular weight, the following molecular formula was found to characterize AM-1042:

$$C_{31} \quad H_{34} \quad N_2 \quad O_7$$

(11) Structural Formula: The structural formula of AM-1042 based on the above analysis is accordingly believed to be:

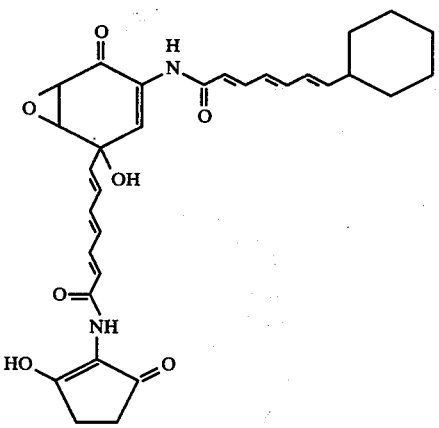

Among the various physical and chemical characteristics of AM-1042 as set forth, the UV absorption spectrum is quite unique and may be used for identifying purpose of AM-1042. Various known antibiotic substances having analogous characteristics to those of AM-1042, such as amicetin B [P. Sensi et al., Anitbiotics and Chemotherapy, 7, 645 (1957)] and azomycin [E. Maeda et al., J. Antiotics, A6, 182 (1953)] have a UV absorption peak at 315 nm. However, amicetin B has, in addition to a peak at 321 nm, another peak at 249 nm in a buffer solution at a pH of 7.0. These peaks are shifted to 329 and 273 (shoulder) nm in alkaline condition and to 311 and 257 nm in acidic condition, respectively. Furthermore, an amide coupling is present in the molecules of amicetin B, whereas it is not present in the molecules of AM-1042 which is negative in Rydon-Smith color reaction. It has thus been confirmed that amicetin B is not identical with AM-1042.

Azomycin has an absorption maximum at 313–314 nm and its pure crystals are colored in white. However, azomycin is optically, inactive, i.e. has no optical rotation. From these findings, it has been confirmed that azomycin is not identical with AM-1042.

Known antibiotic substances having analogous infrared absorption spectra are exemplified by manumycin [Pharmaceu. Acta, Helvetiae, 38, 871–874 (1961) and Tetrahedron Letters (1973) 4995–4998]. However, manumycin shows ultraviolet absorption peaks at 281 nm (log. ϵ4.63) and 325 nm (log. ϵ4.59) and its optical rotation is unique i.e. $[\alpha]_D = +124°$ (c=0.528 in ethanol) and $-185°$ (c=0.4 in chloroform). These characteristics are not identical with those of AM-1042.

Clearly, AM-1042 (or asukamycin) is new and characterized by its unique UV absorption spectrum, above or in combination with its optical rotation.

The biological characteristics of the antibiotic substance AM-1042 according to the present invention are as follows:

Table 1 indicates the antibacterial and antifungal activity of AM-1042 as minimum inhibitory concentration (mcg/ml) determined by the agar dilution method.

TABLE 1

| Test organism | MIC (mcg/ml) |
|---|---|
| Staphylococcus aureus FDA 209P* | 3.1 |
| S. aureus FDA 209P JC-1* | 0.7 |
| S. aureus FS-1277 (penicillin-resistant)* | 6.2 |
| S. aureus KB-64 (tetracycline & erythromycin-resistant)* | 6.2 |
| S. albus* | 12.5 |
| Micrococcus flavus 16* | 1.5 |
| Sarcina lutea PCI 1001* | 6.2 |
| Bacillus subtilis PCI 219* | 3.1 |
| B. subtilis ATCC 6633* | 6.2 |
| B. subtilis NRRL B-558* | >100 |
| B. cereus T* | 3.1 |
| B. megaterium APF* | 6.2 |
| B. anthracis* | 12.5 |
| B. agri* | 12.5 |
| Corynebacterium paurometabolum* | 1.56 |
| Nocardia asteroides* | 1.56 |
| Aerobacter aerogenes IAM 1183* | 100 |
| Mycobacterium smegmatis ATCC 607* | >100 |
| Escherichia coli NIHJ* | 100 |
| E. coli B* | >100 |
| Klebsiella pneumoniae PCI 602* | >100 |
| Proteus vulgaris IFO 3163* | >100 |
| Salmonella typhimurium* | >100 |
| Shigella sonnei E-33* | >100 |
| Pseudomonas aeruginosa P-3* | >100 |
| Candida albicans** | >100 |
| Sacchromyces cerevisiae** | >100 |
| Aspergillus niger** | >100 |
| Cryptococcus neoformans** | >100 |
| Trichophyton mentagrophytes** | 25 |
| Piricularia oryzae** | 100 |
| Alternaria kikuchiana** | >100 |
| Fusarium oxysporum** | >100 |
| Xanthomonas oryzae** | >100 |
| Sclerotinia cinerea** | 100 |
| Botrytis cinerea** | >100 |

[Nortes:
*Peptone 0.5%; meat extract 0.5%; agar 1.2% (pH 7.0), 37° C., 18 hours
**Potato extract containing glucose 1.0% and agar 1.2% (pH 6.8), 27° C. 72 hours]

As is apparent from this table, AM-1042 inhibited the growth of Gram-positive bacteria within a concentration of from 0.78 to 12.5 mcg/ml except for *Aerobacter aerogenes* IAM 1183, *Mycobacterium smegmatis* ATCC 607 and *Bacillus subtilis* NRRL B-558. It had no significant effect on Gram-negative bacteria at concentration below 100 mcg/ml. A weak antifungal activity was observed against *Trichphyton mentagrophytes* at a concentration of 25 mcg/ml while no significant activity on fungi was observed at a concentration below 100 mcg/ml.

The acute toxicity ($LD_{50}$ip.) of AM-1042 in mice calculated by Behrens-Kärber method was 48.5 mg/kg but no side effect on mice was observed when administered by 450 mg/kg per os. Thus it may be possible to use AM-1042 as medicament for preventing and curing infectious diseases caused by a parasite of the above-mentioned microorganisms.

Additionally, the present invention teaches a process for producing AM-1042 viz. asukamycin by fermentation. A microorganism which belongs to the genus Streptomyces and is capable of producing AM-1042 is cultured aerobically in a medium conventionally used for fermentation of microorganism belonging to the genus Streptomyces to accumulate AM-1042 (asukamycin) in the cultured broths. AM-1042 is recovered therefrom.

In this process, it is possible to use AM-1042 strain and any mutant obtained therefrom, as well as any strain which belongs to the genus Streptomyces and which is capable of producing AM-1042.

The microbiological characteristics of the AM-1042 strain (NRRL 8185) which is preferably used in the following examples to produce AM-1042 are as follows:

1. Morphological characteristics: A well-branched substrate mycelium is formed abundantly on most agar media, except for several natural media. Spore chain morphology belongs to section Retinaculiaperti of Spirales having short chains of conidiospores. Spore surfaces are smooth, but they often appeared with wrinkles or folds. Sporangium, sclerotium and zoospore are not observed. Spore has a dimension of $0.5-0.8\mu \times 0.8-1.0\mu$.

2. Cultural characteristics in various media: The cultural characteristics shown in Table 2 were observed after the cultivation at 27° C. for 10 to 14 days.

TABLE 2

(GR = growth; RE = reverse; AM = aerial mycelium; SP = soluble pigment)

| Media | |
|---|---|
| Sucrose-nitrate agar | GR: colorless |
| | RE: Slate Tan(2 ig) |
| | AM: Slate Tan(2 ig) |
| | SP: none to Cream(1½ ca) |
| Glucose-nitrate agar | GR: colorless |
| | RE: Mustard Tan(2 lg) |
| | AM: powdery, poor, Slate Tan(2 ig) |
| | SP: Mustard Gold(2 pg) |
| Glycerol-calcium malate agar | GR: colorless |
| | RE: Maize(2 ea) to Light Mustard Tan(2 ie) |
| | AM: powdery, Beige(3 ge) |
| | SP: Honey Gold(2 ic) |
| Glucose-asparagine agar (ISP) | GR: colorless |
| | RE: Mustard Brown(2 ni) |
| | AM: Slate Tan(2 ig) |
| | SP: Mustard Gold(2 pg) |
| Glycerol-asparagine agar (ISP) | GR: colorless |
| | RE: Honey Gold(2 ic) to Cinnamon(3 le) |
| | AM: powdery, Slate Tan(2 ig) |
| | SP: Golden Brown(3 pg) |
| Starch-inorganic salts agar (ISP) | GR: Mustard Gold(2 pg) or Mustard Brown (2 pi) |
| | RE: Mustard Gold(2 pg) or Copper Tan(5 ie) |
| | AM: Slate Tan(2 ig) |
| | SP: Golden Brown(3 pg) |
| Tyrosine agar (ISP) | GR: Bright Yellow(2 pa) |
| | RE: Mustard(2 le) to Bright Yellow(2 na) in the periphery and Covert Brown(2 li) to Mustard Tan(2 lg) in the centre |
| Peptone-yeast extract iron agar (ISP) | GR: colorless |
| | RE: Mustard Gold(2 pg) |
| | AM: none |
| | SP: none |
| Glucose-peptone agar | GR: poor, colorless |
| | RE: Light Amber(3 ic) |
| | AM: poor, Biscuit(2 ec) |
| | SP: Mustard Gold(2 pg) to Maple (4 le) |
| Nutrient agar | GR: Biscuit(2 ec) |
| | RE: Biscuit(2 ec) |
| | AM: none |
| | SP: none |
| Yeast extract-malt extract agar (IPS) | GR: colorless |
| | RE: Mustard Tan(2 lg) |
| | AM: Slate Tan(2 ig) |
| | SP: Golden Brown(3 pg) |
| Oatmeal agar (ISP) | GR: colorless to Cream(1½ |
| | RE: Bright Yellow(2 na) to Covert Tan (2 ge) |
| | AM: powdery, Covert Tan(2 ge) to Gold (2 lc) |

TABLE 2-continued (GR = growth; RE = reverse; AM = aerial mycelium; SP = soluble pigment)

| Media | |
|---|---|
| | SP: Honey Gold(2 ic) to Gold |
| Tryptone-yeast extract broth (ISP) | GR: colorless |
| | RE: — |
| | AM: white to Slate Tan (2 ig) |
| | SP: none |

[Notes:
Color Harmony Manual (1958) by Container Corpn. of America was referred to.
ISP = Media selected by the International Streptomyces Project]

3. Physiological characteristics:
(1) Growth temperature range: 15° to 40° C.
(2) Formation of melanoid pigment
Trytone—yeast extract broth: negative
Peptone—yeast extract—iron agar: negative
Tyrosine agar: negative
(3) Liquefaction of gelatine: positive
(4) Hydrolyzation of starch: positive
(5) Coagulation of skim milk: suspended positive

C (6) Peptonization of skim milk: positive
(7) Formation of hydrogen sulfide: negative
(8) Formation of nitrous acid: positive
(9) Hydrolyzation of cellulose: suspected positive
(4) Assimilability of various carbon sources:
The following are results obtained by culturing the present strain in Pridham-Gotlieb medium.
Assimilable: D-glucose, D-xylose and L-rhamnose
More or less assimilable: D-fructose, D-raffinose L-arabinose. Not assimilable: D-mannitol, sucrose and I-inositol.

From these data, the present strain apparently belongs to the genus Streptomyces and is similar to *Streptomyces nodosus* [International J. Systematic Bacteriology, 8, 353 (1968)], when compared with various strains described in Energy's Manual of Determinative Bacteriology, 8th Ed. (1974) or International J. of Systematic Bacteriology (1968–1972).

When compared with the ISP standard strain of *S. nodosus*, the present strain and *S. nodosus* provide colorless or slightly colored growth, grayish brown colored aerial mycelium and the yellow type soluble pigment. Other characteristics are also almost the same as those of *S. nodosus*, in particular when cultured in a starch-inorganic salts medium. With regard to the physiological characteristics, *S. nodosus* is non-chromogenic, negative in the formation of hydrogen sulfide and positive in the formation of nitrous acid and hydrolyzation of starch. These characteristics are the same as those of the present strain. On the other hand, the assimilabilities of sugars by the two strains are certainly different from each other. Namely, D-mannitol and I-inositol are assimilated by *S. nodosus* but not by the present strain.

From the above-mentioned comparison, it is reasonable to classify the present strain into *S. nodosus* with respect to its morphological and physiological characteristics, while the present strain is certainly classified into one of the subspecies of *S. nodosus* from the viewpoint of the difference of the assimilability of sugars. The present strain was thus named as *S. nodosus* subsp. asukaensis, however has been deposited as *S. nodosus* subsp. AM-1042.

The present strain has been depotited with the Fermention Research Institute, Agency of Industrial Science and Technology, Chiba-ken, Japan, on a restricted basis (FERM-P-3429) and with ARS Culture Collection, Peoria, U.S.A. on an unrestricted basis (NRRL 8185). It is also possible to obtain a mutant strain thereof for example in conventional manner using ultravoilet ray, X-ray, radiation, chemicals and like. A mutant strain which was obtained by treatment with ultraviolet ray in a conventional manner shows an excellent productivity. It has been deposited with ARS Culture Collection, Peoria, U.S.A. on an unrestricted basis (NRRL 11070), as Streptomyces subsp. AM-1042-16. The AM-1042 producing strains used in the following examples are capable of producing AM-1042 in the cultured broths, viz. both in the cultured liquor and in the microbial bodies.

According to the present process, any synthetic or organic medium may be used when it contains a suitable source of carbon, nitrogen and inorganic substances. If desired, various other nutrients which are conventionally used for culturing various microorganisms belonging to the genus Streptomyces may be added.

It is preferred to use, for example, glucose, maltose, lactose, succharose, starch, dextrine, glycerin, molasses and the like as the carbon source.

The nitrogen sources which may preferably be used are exemplified by soybean meal, corn steep liquor, cotton seed cake, peptone, meat extract, yeast extract, yeast, casein hydrolyzate, ammonium salts, nitrates and the like.

As to the inorganic substances, by way of example, it is possible to use various phosphates, magnesium sulfate, and the like. Various salts of the knwon types, calcium, sodium, iron, managanese and the like may also be used.

Liquid medium is preferred for producing a large amount of AM-1042. However, a solid medium may also be used. It is possible to use a seed medium having a similar composition to that of the main culture medium. The seed is preferably obtained by fermentation carried out aerobically at a temperature of about 27° C. for one or two days, using, for example, a Sakaguchi flask.

The fermentation is carried out under aerobic conditions with shaking at a temperature of from 15° to 40° C. (preferably from 25° to 30° C.) at an adjusted pH of from 6 to 10 (preferably from 6 to 8) for about 2–8 days (preferably from 70 to 150 hours), whereby a large number of AM-1042 is accumulated concurrently in the medium and microbial bodies. After completion of the fermentation, AM-1042 is recovered from the cultured broths. For example, the broths are separated into the microbial bodies and filtrate. It is also possible to recover AM-1042 without separation of the cultured broths. As is apparent from the above physical and chemical characteristics, AM-1042 is soluble in fat. It is, in general, preferred to recover AM-1042 viz. asukamycin by using a suitable method conventionally used to recover various antibiotic substances of this type, such as, for example, by the solvent extraction method.

For example, the cultured broths are separated into a solid and a liquid phase in a conventional manner by filtering, centrifuging and the like. The liquid phase, i.e. the filtrate is adjusted to an acidic pH (preferably from 2 to 4) with HCl and the like and is then extracted with a suitable organic solvent such as e.g. ethyl acetate, butyl acetate and the like, while it is also possible to omit the acidifying step if desired. The extract obtained is concentrated to dryness. The dried material is washed with a suitable solvent such as e.g. ethyl ether to remove fatty impurities, and is then dissolved in a solvent such as e.g. chloroform to remove the impurities further. After this, a column chromatography on silica gel with a chloroform-methanol system gives the active fractions containing AM-1042, which are combined and concentrated to dryness under reduced pressure, resulting in crude powders colored in yellowish orange. The crude powders are dissolved in a small amount of chloroform-methanol system, from which AM-1042 is recrystallized in the form of needle crystals colored in pale yellow. The thus-obtained AM-1042 is assayed in a conventional manner for example by using *Bacillus subtilis* as test microorganism.

Although AM-1042 is active upon *Staphylococcus aureus*, *Sarcina lutea*, *Bacillus cereus*, *Nocarida asteroides* and so on, it has also been found that AM-1042 is an antibiotic substance having an anticoccidial activity in poultry and like, as well as being capable of promoting the growth of poultry. Thus, the present invention further relates to such a therapeutic composition containing an active ingredient an effective amount of AM-1042.

Coccidiosis which is caused by a parasite of protozoa belonging to Coccidia of Sporozoa results in diarrhea and malnutrition of poultry, as well as sometimes resulting in death. This infectious disease is widely prevalent in chickens as well as being found in turkeys, dogs, cats, etc. Mass infection of coccidium is likely to occur, for example, in very young weak chicks. Its prevention is thus widely desired. Oocyst which is one of the generations of this protozoa is excreted into the feces of parasite and forms the spore which is the source of the infection. This protozoa is infected orally and grows in the cells on the surface layer of the intestine of the parasite, resulting in the disease called coccidiosis. Due to the need for preventing and curing coccidiosis which is extremely infectious, attempts have been put forward to provide various anticoccidial agents. For example, those containing as an active ingredient an arsenic compound, nitrofuran, bisphenol, sulfamine, quinoline derivative, pyridine derivative, thiamine derivative, guanidine derivative and the like have been tried. However, known therapeutic compositions do not have sufficient activity on the one hand, and certain sporozoa have become to be resistant to such known therapeutic compositions. It has unexpectedly been discovered that AM-1042 viz. asukamycin is significantly active upon coccidiosis caused for example by *Eimeria tenella*, *Eimeria necatrix*, *Eimeria acervulina*, *Eimeria brunetti* or *Eimeria maxima*. For example, AM-1042 is effective in reducing mortality of chicks infected with *Eimeria tenella*.

According to a further aspect of the present invention, there is provided a pharmaceutical composition comprising AM-1042 as an active ingredient. For the purpose of preventing or curing coccidiosis of poultry, it is possible to administer AM-1042 solely in the form of solid or liquid. It is also possible to add AM-1042 to the diet. The amount to be administered may vary, depending upon the kinds, symptoms and like of the coccidiosis, the age of the host and various other conditions. However, it is preferred to dilute AM-1042 prior to the administration with the diet itself or with one or more ingredients of the diet. Accordingly, the present invention also provides a diet prepared for preventing and/or curing coccidiosis of poultry.

When AM-1042 is diluted by mixing with the diet or its ingredient before the administration, the diluents which may preferably be used for this purpose are exemplified by oat powder, wheat powder, rye powder, corn powder, soybean powder soybean cake, colza-seed cake, defatted or non-defatted rice bran, starch of Irish potato, residue of soybean curd, yeast, fish meal, residue of fermented broths and like. It is also possible to add to such a diet or administer concurrently with AM-1042, if desired, vitamins, minerals, antiseptic, enzyme or yeast preparate, proteins, carbohydrates, amino acids, antifebric, sedative, antiphlogistic, germicide and various other substances.

Although the dosage of AM-1042 for preventing and curing coccidiosis of poultry may vary, depending upon various conditions, it is in general possible to add AM-1042 to the diet in an amount of from 0.003 to 0.03% by weight of the diet. In the case of chickens, the typical dosage of AM-1042 is apparent from the following Table 3. When administered solely or in combination with the diet, it is possible to obtain good results in spite of the form of AM-1042. Because AM-1042 produced by fermentation is contained in both the microbial bodies and the filtrate viz. in the cultured broths, it is also possible to use AM-1042 in the form of crude powders before purification, or in the form of dried broths or dried microbial bodies.

TABLE 3

| | Amount of diet (g/day) | |
|---|---|---|
| Week age | meat-type (broiler) | egg-type |
| 1 | 15 | 5 |
| 2 | 23 | 14 |
| 3 | 41 | 23 |
| 4 | 53 | 30 |
| 5 | 60 | 36 |
| 6 | 66 | 46 |
| 7 | 79 | 53 |
| 8 | 93 | 55 |
| 9 | 101 | 59 |
| 10 | 111 | 63 |
| 11 | — | 66 |
| 12 | — | 70 |
| 13 | — | 75 |
| 14 | — | 79 |
| 15 | — | 85 |

In a preferred embodiment, AM-1042 was diluted to a concentration of from ½ to 1/200 by the addition of soybean powder, defatted or non-defatted rice bran and calcium carbonate. The mixture was then added to a diet to give the concentration of AM-1042 shown in Table 3 above.

By administration of the pharmaceutical composition or the assorted diet according to the present invention, it is possible to prevent and/or cure coccidiosis of poultry such as chickens, turkeys and the like without any side effects. Various experimental results revealed that AM-1042 is not only active on *Eimeria tenella* (even when it is resistant to various chemical agents such as e.g. amprolium hydrochloride, clopidol and robenidine hydrochloride, but also upon other Protozoas belonging to Eimeria, such as e.g. *E. necatrix*; *E. acervulina*; *E. brunetti* and *E. maxima*.

It has also been found that AM-1042 exhibits a growth-promoting effect when it is contained in the diet in an amount of from 0.001 to 0.02% by weight of the diet which is fed to the poultry. Thus, AM-1042 is potentially of interest owing to its growth-promoting effect. For this purpose, the mode of administration is analogous to those described above.

The following non-limitative examples illustrate the present invention.

EXAMPLE 1

A culture medium (ph 7.0; 100 ml) containing glucose (0.1%), starch (2.4%), peptone (0.3%), meat extract (0.3%), yeast extract (0.5%) and calcium carbonate (0.4%) was put in a 500 ml Sakaguchi flask as a seed medium. One platinum loop of *Streptomyces nodosus* subsp. AM-1042 (FERM-P-3429); NRRL 8185) was taken from a slant culture and inoculated to the seed medium for culturing at a temperature of 27° C. for 48 hours with shaking.

The thus-obtained seed was inoculated to a main culture medium (ph 7.0; 100 ml) put in a 30 l jar fermentor and containing dextrine (2.0%), glucose (0.2%), soybean meal (1.5%), yeast extract (0.3%) and calcium carbonate (0.3%). The fermentation was carried out at a temperature of 27° C. for 96 hours with agitation (250 rpm.) and aeration (10 l/minute). Both media were sterilized at a temperature of 120° C. for 20 minutes before use. After completion of the fermentation, microbial cells were removed from the cultured broths by centrifugation. The filtrate (15 l) was adjusted to a pH of 3.0 with 6 N hydrochloric acid. Ethyl acetate (5 l) was added and the filtrate extracted for one hour at room temperature. The solution was again extracted in a similar manner to that set forth.

The ethyl acetate layer was taken out and concentrated to dryness under reduced pressure to give yellow-orange powders (4.3 g) which was washed with ethyl ether (200 ml) to remove fatty impurities. It was allowed to stand in a cold place for a night. After this, the solution was filtered to remove insoluble subsances and was concentrated to dryness under reduced pressure. The dried material was transferred to a column packed with silica gel (54 g of Kieselgel G, a commercial product of Merck Inc., Rahway, N.J.) and developed with a solvent system of chloroform-methanol (1.5 l; 60:1 v/v). The eluate was divided into individual fractions (each 10 ml). Each fraction was then quantitively determined by means of bioassay using *Bacillus subtilis* PCI 209 and also by relying upon a Rf value of 0.56 obtained by a thin layer chromatography using a solvent system of chloroform-methanol (60:1). Fractions Nos. 111 to 150 were combined as active fractions and concentrated to dryness under reduced pressure to give yellow powders (350 mg). The powders were dissolved in a small amount (5 ml) of a mixture of chloroform and methanol (95:5) and allowed to stand in a cold place for a night to obtain pale yellow needles (300 mg) having a purity of more than 99%. The needles had the following characteristics.

Melting point: 185° to 190° C. (decomp.)

Specific rotation: $[\alpha]_D^{20} = +175°$ to 184°; 181° in average (c=0.5 in CHCl$_3$)

UV absorption spectrum: 90% Me-OH, nm: 315 and 265 (shoulder)

IR absorption spectrum by KBr method: Characteristic strong absorptions at 3330–3340, 2925, 2850, 1660 and 1365 cm$^{-1}$.

EXAMPLE 2

A strain of *Streptomyces nodosus* subsp. AM-1042 (FERM-P-3429; NRRL 8185) was cultured in a similar manner to that described in Example 1. The subsequent treatment was also carried out in a similar manner to that described in Example 1 with the following exceptions. The filtrate having an adjusted pH was extracted by adding butyl acetate twice (each 6 l) and was then concentrated to dryness to give yellowish orange powders (5.5 g) which was dissolved in chloroform (400 ml). Column chromatography was carried out by using the silica gel (65 g) and a solvent system of benzene-acetone (2.6 l; 8:1 v/v) to give individual fractions (each 15 ml). Fractions Nos. 139 to 173 were combined to give an active fraction. The crude powders obtained where colored in yellowish orange (480 mg) were then dissolved in a mixture of yellowish orange (480 mg) were then dissolved in a mixture of ethyl acetate and methanol (5 ml in total; 95:5). The yellowish orange needle crystals (360 mg) obtained had a purity of more than 99%. The identifying characteristics of the product were the same as those described in Example 1.

EXAMPLE 3

A culture medium (pH 7.0; 100 ml) containing glucose (2%), soybean meal (2%) and table salt (0.2%) was put in a 500 ml Sakaguchi flask and was sterilized at a temperature of 120° C. for 20 minutes. This medium was used as a seed medium, to which a strain of *Streptomyces nodosus* subsp. Am-1042-16(NRRL11070) was inoculated for culturing at a temperature of 27° C. for 24 hours with shaking. The seed was then inoculated to a main culture medium (pH 7.0; 20 l) which was put into a 30 l jar fermentor. The main culture medium contained glycerin (2%), soybean meal (2%) and table salt (0.2%) and was sterilized at a temperature of 120° C. for 20 minutes before use. The fermentation was carried out at a temperature of 27° C. for 72 hours with shaking (250 rpm.) and aeration (10 l/minute). After completion of the fermentation, the microbial bodies were not separated from the cultured broths. Ethyl acetate (20 l) was then added. After extraction at room temperature for one hour with agitation, the ethyl acetate layer (15 l) was separated by centrifugation and concentrated to dryness under reduced pressure. The yellowish orange powders (25.8 g) thus produced were washed with ethyl ether (500 ml) for removal of fattyy impurities and were then dissolved in chloroform (500 ml). After this, the chloroform layer was concentrated to an amount of 20 ml under reduced pressure. The concentrated material was transferred to a column packed with silica gel (200 g; Kieselgel G, a commercial product of Merck Inc., U.S.A.) and developed with a solvent system of chloroform-methanol (3 l; 60:1 v/v). The eluate was divided into individual fractions (each 20 ml). Each fraction was assayed in a similar manner to that described in Example 1. Fractions Nos. 91 to 150 were combined and concentrated to dryness under reduced pressure. The dried material (12 g) was then dissolved in a small amount (20 ml) of a mixture of chloroform and methanol (95:5 v/v) and allowed to stand over night to obtain yellow needle crystals (10 g) having a purity of more than 99%.

The identifying characteristics of the product were the same as those described in Example 1.

EXAMPLE 4

Chicks (7-day-old) were divided into several groups. From 48 hours after their birth until two days before the beginning of the test, all chicks were fed a diet containing 0.1% of a pharmaceutical composition (sulfadimethoxine) for preventing the infection of coccidiosis.

The chicks of the test groups were fed with a diet containing the matured oocysts of *Eimeria tenella* K-2 (resistant to amprolium, clopidol and robenidine hydrochloride.

The diet used consisted of yellow corn (67%), soybean powders (14%), fish meal (15%), alphalpha (3%), tablet salt (0.25%), vitamin mixture (0.25%), mineral mixture (0.05%), arginine (0.1%), sodium propionate (0.15%) and ethoxyquin (0.1%). The anticoccidial agents added to the diet are shown in the following table. Each chick was fed with the diet in an amount of 17 g/day (in average). 140 chicks were divided into individual groups (each 10 chicks). After seven days from feeding with the diet containing the oocysts ($2.5 \times 10^4$) the weight of each chick was measured, and all chicks were killed and dissected for examination.

TABLE 4

Degree of caecal lesion
− not infected; + light;
++ middle; +++ heavy

| Anticoccidial Agent | Concentration % | Caecal lesion (numbers of chicks) | | | | Survival ratio % |
|---|---|---|---|---|---|---|
| | | +++ | ++ | + | − | |
| AM-1042 | 0.03 | | | | 10 | 100 |
| | 0.02 | | | | 10 | 100 |
| | 0.015 | | | | 10 | 100 |
| | 0.01 | | | 2 | 8 | 100 |
| | 0.0075 | | 2 | 5 | 3 | 100 |
| | 0.005 | 3 | 4 | 3 | | 90 |
| | 0.00375 | 5 | 4 | 1 | | 90 |
| Amprolium hydrochloride | 0.025 | 8 | 2 | | | 70 |
| | 0.0125 | 10 | | | | 40 |
| Clopidol | 0.025 | 6 | 4 | | | 70 |
| | 0.0125 | 10 | | | | 50 |
| Robenidine hydrochloride | 0.0066 | 3 | 5 | 2 | | 100 |
| | 0.0033 | 8 | 2 | | | 80 |
| Nil | 0.0000 | 10 | | | | 50 |

EXAMPLE 5

A similar treatment to that described in Example 4 was carried out with the exception that a mixture of the matured oocysts of *Eimeria tenella* K-2 ($2.5 \times 10^4$), *E. acervulina* ($1.0 \times 10^5$) and *E. maxima* ($1.0 \times 10^6$) was inoculated. The results are shown in Table 5 where the ratio of the increase of the body weight (RIW) is calculated as follows:

(RIW (%) = [weight at the completion of the test (in average)]/[weight of healthy chicks (control) in average] × 100%.

TABLE 5

| Group | Concentration of AM-1042(%) | Caecal lesion | RIW % | Survival ratio(%) |
|---|---|---|---|---|
| Test-1 | 0.02 | − | 100.2 | 100 |
| Test-2 | 0.015 | − | 100.5 | 100 |
| Test-3 | 0.01 | − | 100.8 | 100 |
| Test-4 | 0.0075 | − | 99.9 | 100 |
| Test-5 | 0.005 | + | 98.7 | 90 |
| Control-1* | nil | − | 100.0 | 100 |
| Control-2 | nil | ++ | 87.6 | 45 |

[*not inoculated]

Having described the present invention, that which is sought to be protected is set forth in the following claims.

We claim:

1. A composition AM-1042 having antibiotic activity and represented by the formula:

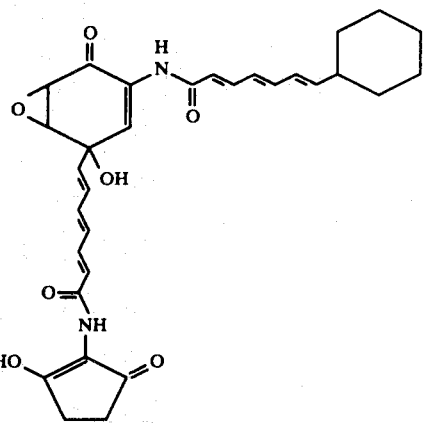

2. A process for producing

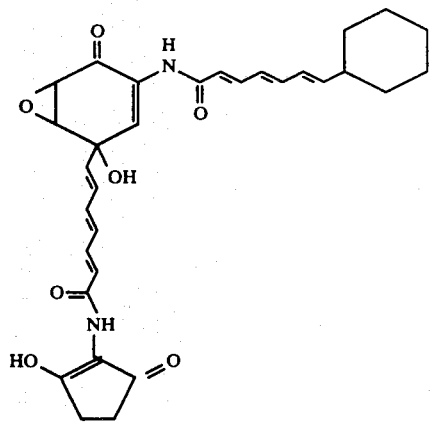

which comprises aerobically culturating a microorganism *Streptomyces nodosus subsp. asukaensis* in a medium until a sufficient amount of said compound is imparted to said medium, and recovering said compound therefrom.

3. The process of claim 2, in which the culturing is effected at a temperature of from 15° to 40° C.

4. The process of claim 2, in which the culturing is effected at a pH of from 6 to 10.

5. The process of claim 2, in which the product is recovered from the culture medium by solvent extraction.

6. A veterinary composition comprising as active ingredient an effective amount for preventing or treating coccidiosis of the compound

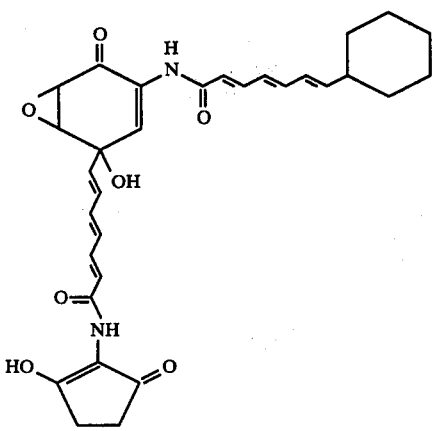

in association with a physiologically acceptable carrier or excipient.

7. The composition of claim 6, in which the carrier or excipient comprises an edible foodstuff.

8. The composition of claim 6 containing 0.003 to 0.03% by weight of the active ingredient.

9. A method for preventing or treating coccidiosis in an animal subject which comprises administering to said animal subject an effective amount of the compound

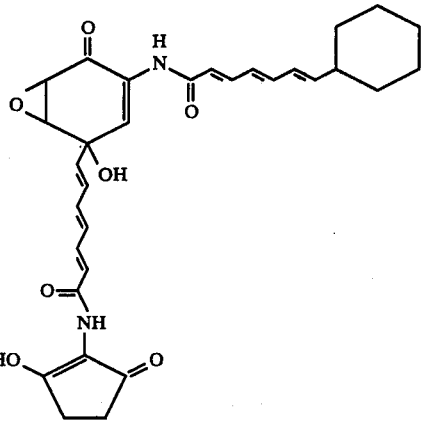

for preventing or treating coccidiosis as active ingredient in association with a physiologically acceptable carrier or excipient.

10. The method of claim 9 wherein 0.003 to 0.03% by weight of the active ingredient based on weight of the diet is administered to said animal subject.

* * * * *